Feb. 17, 1931.  C. C. WORTHINGTON  1,793,271
LAWN TRACTOR
Original Filed May 9, 1925   2 Sheets-Sheet 1
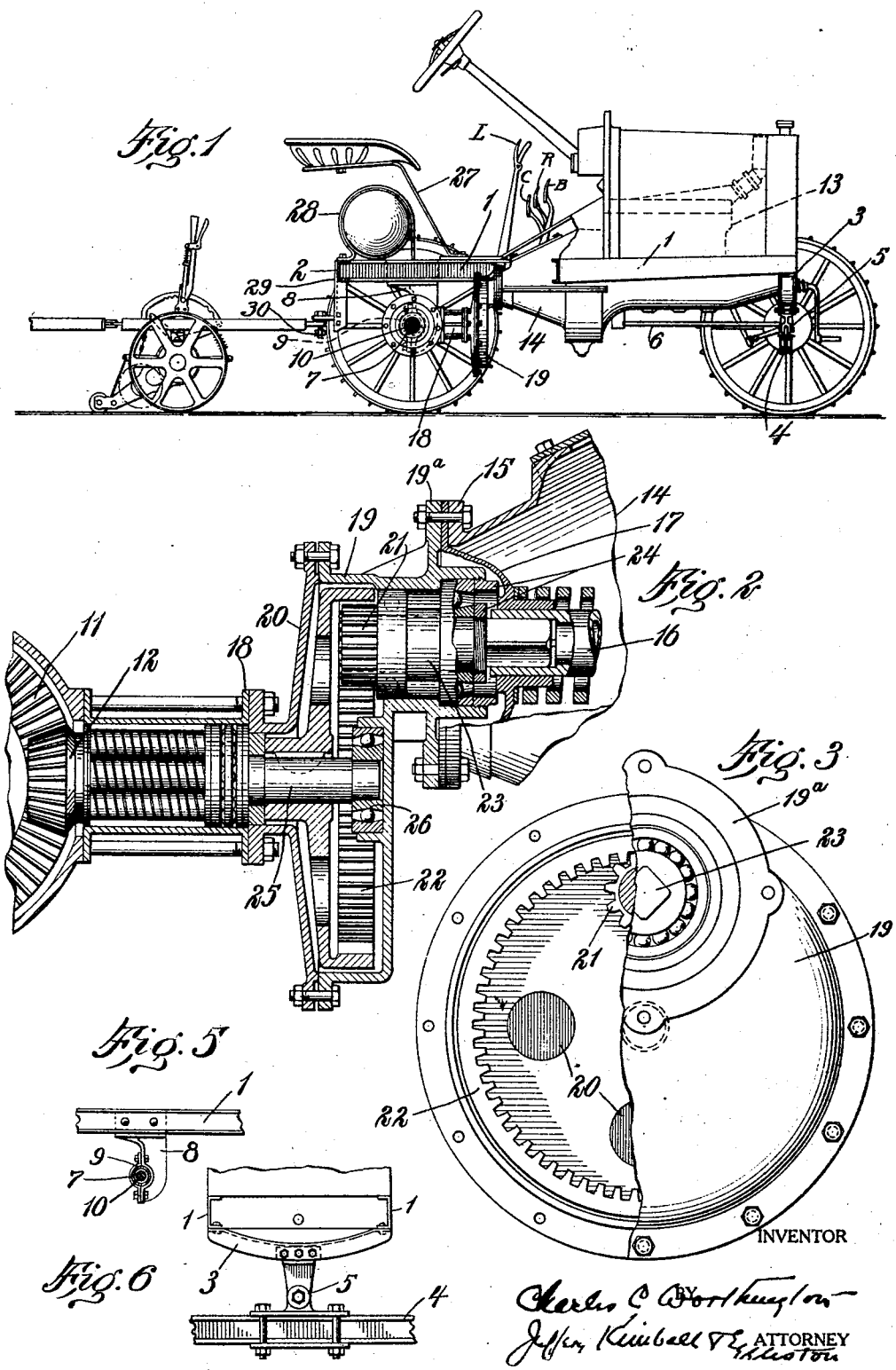
INVENTOR

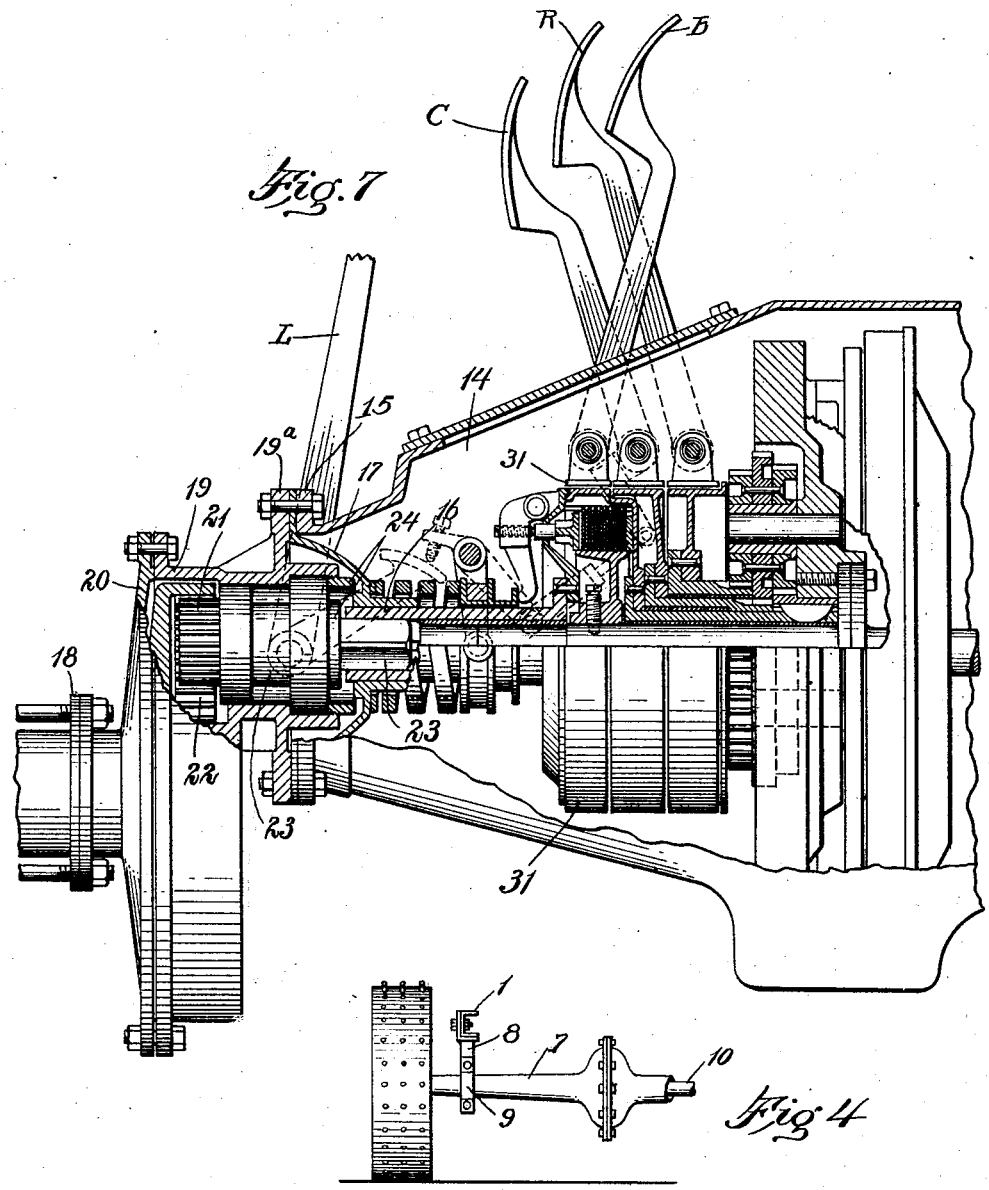

Patented Feb. 17, 1931

1,793,271

UNITED STATES PATENT OFFICE

CHARLES C. WORTHINGTON, OF DUNFIELD, NEW JERSEY

LAWN TRACTOR

Application filed May 9, 1925, Serial No. 29,042. Renewed July 22, 1930.

The object of this invention is an automotive tractor properly suited for operating gang mowing machines and the like on golf courses. I have found that such a tractor must be of short wheel base and capable of turning on curves of very short radius so that it can haul the mowing machine into and out of constricted areas and close to bunkers; it must be of very light weight in order that its wheels will not unduly roll down and harden the surface of the ground. At the same time it must possess adequate tractive force for propelling the mowing machine up such grades as are ordinarily encountered, even when the grass is wet and notwithstanding its short base and light weight, it must be so designed that the draft pull and driving torque will never lift the front wheels or tip the machine over backward. Such a tractor must of course also be capable of production on a cost basis comparable to the ordinary farm tractor, or small automobile, in order that it may be within the financial reach of the ordinary golf club.

All these requirements have not heretofore been met, so far as I am aware, and in consequence, the work of propelling or hauling gang lawn mowers is now commonly done either by the use of one of the standard farm tractors, by Ford or other automobiles, or by such automobiles converted over into low speed trucks. Although these propelling means are generally of fairly low cost, none of them is satisfactory; the farm tractor is much too heavy for use on soft turf; the unmodified Ford car or chassis requires to be used constantly in its low gear setting which is objectionable for several reasons, and both the unmodified automobile and the converted truck have the serious objection that the combination of such a propelling means with the mowing machine hitched to it, makes an outfit of such great over-all length that it is inconvenient to use it except in the larger open spaces of the golf course. A considerable portion of the mowing must therefore be left to be done by hand because it cannot be reached by the machine.

I have succeeded in producing a lawn tractor eliminating these objections and meeting all the above mentioned requirements, and which can be profitably sold at a cost not greater than that of the unsatisfactory propelling means now generally used, thereby providing for golf clubs and owners of large estates, an inexpensive light tractor which while also suitable for general hauling purposes, is particularly adapted for lawn mowing and when so used affords a large saving of labor and without injury to the lawn or golf course. I accomplish this result by the use of certain standard automobile parts, or assemblies of parts, which can be inexpensively obtained, because of their large scale production, and by the use of certain additional parts which are also cheaply produced, and by the method of combining these assemblies and parts as hereinbelow pointed out.

The accompanying drawings exemplify the principles of the invention and the best manner in which I have thus far been able to incorporate them, utilizing in this instance standard assemblies of a Ford chassis for the purpose. Figure 1 is a side elevation of the lawn tractor in the form at present preferred.

Fig. 2, an axial section of the intermediate reduction unit the same being the principal extra part needed for the production of the tractor.

Fig. 3, front elevation of such unit, partly broken away.

Figs. 4 and 5 illustrate the rear axle mounting.

Fig. 6 the front axle pivot; and

Fig. 7, the standard Ford transmission with the reduction unit applied and shown in elevation.

The tractor comprises a frame which can be produced from the frame of a standard Ford or other chassis, by simply cutting off the rear ends of the two side girders 1 and joining them by a rear cross-member or channel iron 2 thereby making a shortened frame. The original front cross member of this frame marked 3, is supported on the front or steering axle 4 by a direct pivotal bearing 5, (Fig. 6), the pivotal axis of which is longitudinal of the tractor so that the front axle can thereby assume varying vertical angles with reference to the frame, in accommodation to the undulations of the lawn. No spring is necessary, although one could be employed, if desired; its elimination permits a greater angle of axle oscillation and saves expense.

The front axle with its usual steering knuckles drag link and connections to the operator's steering wheel, are the standard Ford assembly, unchanged, the axle being braced, as usual in the Ford chassis, by the stay rods 6 which keep it square with the frame while permititng it to accommodate the axle movement.

The rear end of the shortened frame is supported on the rear axle housing 7 by means of two bolster brackets 8, each a simple casting or stamping. These brackets 8 are bolted directly to the side girders 1 and their lower ends are socketed to embrace the axle housing which is clamped in the sockets by the bolted caps 9, see Figs. 4 and 5. For convenience of assembly the axle sockets are open to the rear and the caps are arranged to be applied horizontally.

The rear axle housing 7 is the standard Ford rear axle assembly without change, and will be understood to contain the usual live axle shafts or drive-axles 10 driven by the usual differential gearing at the center of the housing. A portion of this differential gearing, the ring gear 11, and also its driving pinion 12, appear in Figure 2, together with the roller bearings in which such pinion is journalled. The construction of this differential mechanism will not require description.

The rear ground wheels which are connected to and driven by the live axles 10 as usual are supplied with wide flat treads armed with cleats or short caulks; as shown in Fig. 4; the front or steering wheels have wide treads and both front and rear wheels are of small diameter, about 27 inches, so that the operator's seat is close to the ground and easily entered. Standard Ford automobile wheels may be cheaply employed for this purpose by substituting for the regular pneumatic tires and their rims, the wide flat wheel treads above referred to. This simple substitution reduces the wheel diameter to a size appropriate for lawn tractor purposes. The rear brake drums and brakes are dispensed with. The side hand lever is retained only to put the gear in neutral.

The unit-type Ford power-plant is mounted on the frame in the same position as in the automobile. It comprises the engine proper marked 13 and its normal transmission contained in a housing marked 14, both the engine and transmission being secured as a unit on the tractor frame and being preferably bolted or rigidly secured in place thereon. The transmission housing as will be understood is a virtual extension of the crank case casting of the engine. The transmission, within the housing 14, comprises the usual Ford epicyclic change-speed, reverse and clutch mechanism shown in Fig. 7 and the operation of which is well understood by those skilled in this art. It is controlled by two of the pedals marked C and R, the former being the clutch and speed change pedal and the latter the reverse pedal. The connection of the clutch pedal to the clutch is clear in the drawing. The hand lever L also controls the clutch as usual and is used to hold the transmission open or in neutral position when desired. The pedal B is the service brake, being connected to the brake band 31 surrounding the clutch shell.

The rear end of the change-speed housing 14 terminates in a flanged opening marked 15 in Fig. 2, which contains the square-socketed end of the standard clutch or transmission shaft 16 and ordinarily also accommodates the universal joint of the Ford propeller shaft (not shown). The transmission shaft 16 is employed for the present invention, but no universal joint is required because, in accordance with this invention, the engine, and drive axle housing are set in exact alignment and rigidly united with no intervening spring, and the frame itself, being very short, is substantially free of flexure. The bell-shaped member 17 which takes the thrust of the clutch spring and supports the rear end of the transmission shaft 16, is retained and its peripheral flange is secured to and between the housing flange 15 and the flange 19$^a$ of the reduction gear unit which is bolted to the transmission housing.

The drive connection between the transmission shaft 16 and the rear axle of the tractor is made by a pair of reducing gears contained in a housing formed of two united sections 19 and 20. The gears therein are marked 21 and 22, the former being a spur pinion and the latter an internal spur gear driven by it. These gears and their two part housing constitute the reduction gear unit just referred to and represent the principal part necessary for this invention, which is not a part of any standard automobile. It requires to be made up specially for the type or kind of engine and the kind of axle housing used, so that it will fit both, but it is in any event simple in design and cheaply produced. In the present case, as designed for connection between standard Ford parts, its forward flange is drilled to be bolted directly to the transmission flange 15, as indicated in Figs. 2 and 7, and its rear side is similarly flanged to be bolted to the rear axle flange 18, using the same bolts that are normally used on the latter. The small gear or pinion, 21, is formed on the end of a short shaft 23, the forward end of which is slabbed square to project into the transmission housing 14 and fit the square socket in the end of the transmission shaft 16 and this shaft, 23, is journalled in ball bearings seated in the tubular part of the housing 19 as shown in Fig. 2, being secured against end play therein by the threaded rings 24. The hub of the internal gear 22 is hollow and keyed to the projecting shaft 25 of the standard differential drive pinion 12 which is journalled in the differential housing, and such shaft projects through the hub and is journalled at its forward end in a ball-bearing 26 carried on the front wall of the reduction unit. The propelling power is thus transmitted when the clutch is closed, from the shaft 16 through the gears 21 and 22 to the differential pinion 12 and the live axles 10 and thence to the rear wheels, and it will be understood that they may be driven either at "high" or "low" speed, or reversed, according to the use of the control pedals.

The gear ratio of the reduction unit is preferably about 5 to 1, with drive wheels of the diameter indicated, and this ratio enables the tractor to be driven for mowing and other hauling work with its transmission mechanism set in its direct or high gear position, the final drive ratio being then about 17 to 1. The low gear setting of pedal C is not necessary except for starting or very slow running or unusually heavy draft.

The housing 19—20 of the reduction gear unit unites and combines the engine transmission housing and the drive axle housing into a rigid, single housing or unit, extending from the engine to the rear axle, with all the driving elements contained within it and protected by it.

It is a feature of the invention and a factor of the construction, in its best form, that the housing of the intermediate or supplementary reduction unit forms a continuous enclosed connection as just stated between the transmission housing and the differential housing and that the form of attachment of the intermediate housing to the transmission housing is one by or through which the axle-housing is sustained against displacement in its bolster brackets, whether or not said attachment is rigid in respect to other strains.

The longitudinal dimension of the reduction gear unit is no greater than sufficient to provide an adequate width of gear tooth for its two contained gears and proper bearings for them and this dimension is found to be small enough to permit the rear axle to be located well under or forward of the location of the operator's seat as shown, which seat is situated in its normal position with reference to the engine, just in rear of the steering wheel and the control pedals. It is carried by a flat flexible stem 27. This gives the tractor a wheel base which is very short without the need of using sprocket chains or lay shaft to drive the rear wheels. With Ford parts, the wheel base can be as short as fifty-five inches and with parts of any other small automobile, the bolster brackets can be set either back or forward on the side girders, as necessary, but in any case giving a short wheel base, as short or shorter than found in farm tractors and of course much shorter than in a Ford or other automobile or truck suited for hauling purposes.

As already noted, shortness of wheel base is essential for lawn mowing uses, since it not only reduces the turning radius and thereby increases the flexibility, but also reduces the overall length of the tractor-mower combination. It enables the mowing machine to be used in places which it could not otherwise enter, besides affording other and obvious conveniences when the apparatus is taken into the barn or shed.

Obviously the tractor above described is very light in weight, much lighter than the chassis of the automobile whose parts it uses, because its frame is shorter and it has no springs. The weight of the reduction unit is not greater than the propeller shaft, universal joint and torque rod, which it displaces. The rear cross member 2 of the tractor frame is provided with a depending draft bracket 29 having a hitching bolt 30 at its lower end substantially at the level of the wheel axes so that the draft pull has no tendency to lift the front wheels.

The use of an internal spur gear as part of the reduction unit has a particular advantage in the described organization and is a feature of the invention because it provides the necessary intermediate speed reduction within a minimum vertical dimension of reduction unit housing, thereby affording adequate clearance from the ground notwithstanding the small diameter of the tractor wheels. At the same time such a gear drives the differential pinion 12 in the same direction as the engine rotation and thus requires no change in the axle or differential when the parts are assembled, with corresponding saving of expense.

The ordinary standard rear-wheel brake system may be used if desired, although not necessary. The parts of this mechanism, as well known, are normally carried by the drive-axle and transmission housings, being operated by lever L, so that their adaptation to the tractor can be simply accomplished by shortening the pull rods. These parts do not appear in the drawing. The engine radiator is shown in its usual position and for the sake of appearance the engine is enclosed by the usual hood, all these parts being standard automobile equipment. The fuel tank 28 is conveniently strapped on the end of the frame below the driver's seat.

I claim:

1. A tractor for operating lawn mowing machines on golf courses, comprising a short frame pivotally mounted at one end on a steering axle and rigidly mounted at the other end on a drive-axle housing, said pivotal mounting having a longitudinal axis, an engine on said frame comprising a transmission housing containing change-speed and clutch mechanism, an intermediate housing secured to and between and uniting said transmission and axle housings and forming a support for the former upon the latter, and reducing gears in said intermediate housing through which said change-speed mechanism drives the drive-axle.

2. A tractor for operating lawn mowing machines on golf courses, comprising a short frame mounted at one end on a steering axle and mounted at the other end on a housing containing drive-axles, an engine on the frame having a transmission housing containing change-speed and clutch mechanism, an intermediate housing secured to and between and uniting said transmission and drive-axle housings, a pinion journalled in said intermediate housing and driven by said mechanism, an internal gear also journalled in said intermediate housing, meshing with said pinion and connected in driving relation to the drive-axles.

3. A tractor for operating lawn mowing machines on golf courses, comprising an engine supported at one end on steering wheels and at the other end on a housing containing differential gearing and drive-axles, said engine having a transmission housing formed as a rigid extension of the crank case enclosure thereof and containing change-speed and clutch mechanism, a rigid intermediate housing bolted to and between said transmission and drive-axle housings and uniting the engine and drive-axle housing into a single rigid structure, and reducing gears in said intermediate housing respectively engaged with said clutch mechanism and said differential gearing.

4. A tractor for operating lawn mowing machines on golf courses, comprising an engine supported at one end on steering wheels and at the other end on a housing containing differential gearing and drive-axles, said engine having a transmission housing formed as a rigid part of its crank enclosure and containing change-speed and clutch mechanism, an intermediate reduction-gear unit secured to and between said transmission and axle housings and thereby uniting the latter to the engine, said unit comprising a pinion having a shaft projecting into said transmission housing and engaged therein with said clutch mechanism and a larger gear driven by said pinion and itself driving said differential gearing.

5. A tractor for operating lawn mowing machines on golf courses, comprising a frame carrying the propelling engine at one end and the driver's seat over the other end thereof, a steering axle supporting the engine end of said frame, a housing containing drive-axle and differential gearing connected to and supporting the other end of said frame, said drive-axle housing being situated directly beneath the driver's seat and a reducing gear unit comprising reducing gears and a housing therefor, said unit forming a vertically rigid connection between said drive-axle housing and the engine.

6. A tractor for the purpose specified, comprising a standard automobile chassis having the rear end of its frame cut off and its rear-axle housing rigidly secured to the rear end of the cut-off frame approximately below the driver's station, and in rear of the transmission housing of the engine, in combination with an intermediate housing connected to and between said transmission housing and said rear-axle housing, and reducing gears in said intermediate housing forming the drive-connection between the engine and the rear axle.

7. A tractor for the purpose specified comprising a short frame, an engine thereon, a transmission housing containing change speed and clutch mechanism, said frame being supported on a front axle by means of a pivotal bearing centrally located thereon and having a longitudinal axis, and being rigidly supported on a rear axle housing, containing drive-axles and differential gearing therefor, in combination with a reduction gear housing forming an enclosed connection between said transmission and rear axle housings and containing reduction gears for driving said differential gearing.

8. A tractor made from standard automobile parts for the uses specified, comprising a shortened frame having one end supported on a drive-axle housing containing drive-axles and differential gearing, the latter including a differential pinion, a propelling engine on said frame having a transmission housing formed as a rigid part of its crankcase enclosure and containing change-speed and clutch mechanism, and a reducing gear couple interposed between and connecting said mechanism and said pinion, said couple having its larger gear rigidly and co-axially fixed to said pinion and having its smaller gear driven by said transmission mechanism.

9. A tractor for lawn mowing and like uses comprising a frame supported at one end on a steering axle and having its other end supported on a housing containing drive-axles and differential gearing, the latter including a differential pinion shaft, an internal combustion propelling engine mounted on the steering end of said frame and having a transmission housing formed as a rigid part of its crank-case enclosure, said housing containing change-speed and clutch mechanism, and a reduction gear couple interposed between and connnecting said transmission mechanism and said differential gearing, the larger gear of said couple being co-axial with and supported on said pinion shaft.

10. A tractor for the uses specified comprising a frame supported on a drive-axle housing containing drive-axles and differential gearing the latter including a differential pinion, an engine on said frame having its transmission housing formed as a part of it, said housing containing change speed and clutch mechanism, and a reduction gear unit connected between said housings, said unit comprising a small gear having a journal bearing within the rear end of said transmission housing and a larger gear co-axial with and supported on the same journal bearing as said differential pinion.

11. A tractor for the uses specified comprising a frame supported on a drive-axle housing containing drive-axles and differential gearing, the latter including a differential pinion, an engine on said frame having its transmission housing formed as a part of it, said housing containing change speed and clutch mechanism, and a reducing gear couple connecting said mechanism to said pinion, said couple comprising a small spur gear driven by said mechanism and an internal spur gear in mesh therewith and connected to said differential pinion.

12. A tractor for the uses specified and made of standard automobile parts, comprising, in combination, the engine transmission housing containing the standard change speed and clutch mechanism, the drive-axle and differential housing containing the differential pinion and pinion shaft, and an intermediate gear couple between said housings comprising a small spur gear having a shaft projecting into said transmission housing and an internal gear meshing with said spur gear, having its hub socketed and keyed to the differential pinion shaft.

13. A tractor for the purpose specified, comprising a frame carrying the propelling engine at one end and having rigid bolster brackets at the other end rigidly supporting the same on a drive axle housing, said housing containing drive-axles and a differential gearing, a reduction gear housing rigidly connected to said axle housing and a reducing gear couple in said housing forming the driving connection between the engine and said differential gearing.

14. A tractor for the purpose specified comprising a frame supported on front steering wheels and on a rear axle-housing containing drive-axles and differential gearing, an engine structure occupying the forward part of said frame and including a transmission housing containing change-speed and clutch mechanism and carrying a clutch pedal situated approximately midway between the front and rear ends of said frame, an operator's seat situated in rear of such pedal and approximately over said rear axle-housing, an intermediate housing between said other housings, and speed-reduction gearing in said intermediate housing connected with said transmission mechanism and differential gearing respectively.

In testimony whereof, I have signed this specification.

CHARLES C. WORTHINGTON.